US011001313B2

(12) United States Patent
Turner

(10) Patent No.: US 11,001,313 B2
(45) Date of Patent: May 11, 2021

(54) EASILY DISASSEMBLE TAIL GATE APPARATUS

(71) Applicant: Rayefield J Turner, Grain Valley, MO (US)

(72) Inventor: Rayefield J Turner, Grain Valley, MO (US)

( * ) Notice: Subject to any disclaimer, the term of this patent is extended or adjusted under 35 U.S.C. 154(b) by 21 days.

(21) Appl. No.: 16/392,202

(22) Filed: Apr. 23, 2019

(65) Prior Publication Data

US 2019/0248425 A1 Aug. 15, 2019

Related U.S. Application Data

(63) Continuation-in-part of application No. 29/612,743, filed on Aug. 3, 2017, now Pat. No. Des. 846,481.

(51) Int. Cl.
*B62D 33/033* (2006.01)
*B60R 9/06* (2006.01)
*A45B 23/00* (2006.01)
*B60P 3/36* (2006.01)

(52) U.S. Cl.
CPC ............ *B62D 33/033* (2013.01); *A45B 23/00* (2013.01); *B60P 3/36* (2013.01); *B60R 9/065* (2013.01)

(58) Field of Classification Search
CPC ......... B62D 33/033; B60P 3/36; A45B 23/00; A47B 31/06; A47B 23/041
USPC .......... 108/44, 45, 25; 135/16, 88.05, 88.01, 135/88.96, 88.16
See application file for complete search history.

(56) References Cited

U.S. PATENT DOCUMENTS

| 4,887,526 | A | 12/1989 | Blatt |
| 5,106,002 | A | 4/1992 | Smith |
| 5,203,266 | A | 4/1993 | Stevens |
| D389,452 | S | 1/1998 | Scott |
| 5,752,639 | A | 5/1998 | Rice |
| 5,816,638 | A | 10/1998 | Pool, III |
| 5,950,617 | A * | 9/1999 | Lorenz ..................... B60R 9/06 108/44 |
| 6,082,269 | A | 7/2000 | Padberg |
| 6,189,458 | B1 * | 2/2001 | Rivera ................... B60N 3/001 108/150 |
| 6,314,891 | B1 | 11/2001 | Larson |
| 6,336,413 | B1 | 1/2002 | Ball |
| 6,662,983 | B2 * | 12/2003 | Lane ........................ B60R 9/06 108/44 |
| 6,739,269 | B1 | 5/2004 | Benton |
| 6,752,088 | B2 * | 6/2004 | Poarch .................. B60P 3/0257 108/44 |
| 6,857,741 | B2 | 2/2005 | Blum et al. |
| D514,057 | S | 1/2006 | Borunda |

(Continued)

OTHER PUBLICATIONS

Trailer Hitch Umbrella, image post date Jun. 25, 2011 , site visited Jul. 11, 2018, (online), <https://www.flickr.com/photos/amykclark/5907349935>.

(Continued)

*Primary Examiner* — Jose V Chen
(74) *Attorney, Agent, or Firm* — Erickson Kernell IP, LLC; John C McMahon

(57) ABSTRACT

A tail gating apparatus including a horizontal frame with various tables positioned thereon on spindles that allow the tables to rotate in supports mounted on the frame. The frame also supports shade producing umbrellas and alternatively a cook's seat, a stabilizing plate and a wind protection shield.

6 Claims, 12 Drawing Sheets

(56) References Cited

U.S. PATENT DOCUMENTS

| | | | |
|---|---|---|---|
| D519,430 S | 4/2006 | Moody | |
| 7,066,096 B1 * | 6/2006 | Harker | B60R 15/02 |
| | | | 108/44 |
| 7,090,104 B2 | 8/2006 | Dorety | |
| 7,156,273 B2 | 1/2007 | Morris | |
| 7,182,380 B2 | 2/2007 | Nagle | |
| 7,281,646 B2 | 10/2007 | Flannery | |
| D563,114 S | 3/2008 | Pegg | |
| D601,078 S | 9/2009 | Devereux | |
| D602,293 S | 10/2009 | Barfield | |
| 7,757,613 B2 | 7/2010 | Fisher | |
| 7,793,967 B2 | 9/2010 | McConnell | |
| 7,810,439 B2 | 10/2010 | Bless | |
| 8,065,996 B1 | 11/2011 | Neuvelt | |
| 8,109,552 B2 | 2/2012 | Nelson | |
| 8,231,036 B2 | 7/2012 | Campbell | |
| 8,291,832 B2 * | 10/2012 | Fisher | B60R 9/06 |
| | | | 108/44 |
| 8,616,630 B1 * | 12/2013 | Midkiff | A47B 83/02 |
| | | | 297/174 R |
| 8,757,694 B1 | 6/2014 | Kuhnle | |
| 8,899,620 B1 | 12/2014 | Bhardwaj | |
| 8,931,671 B2 | 1/2015 | Olsen | |
| 9,113,717 B2 * | 8/2015 | Edwards | A47C 15/004 |
| D737,750 S | 9/2015 | Garrett | |
| D746,215 S | 12/2015 | Leavitt | |
| D747,260 S | 1/2016 | Cantrell | |
| 9,333,822 B1 | 5/2016 | LaFave | |
| 9,387,806 B2 | 7/2016 | Bzoza | |
| D766,610 S | 9/2016 | Johnson | |
| D771,546 S | 11/2016 | Dall'Era | |
| 9,481,316 B2 | 11/2016 | Faruque | |
| 9,522,635 B2 | 12/2016 | Nusbaum | |
| D778,652 S | 2/2017 | Siebert | |
| D781,628 S | 3/2017 | Lin | |
| D791,299 S | 7/2017 | Neuberger | |
| 9,718,411 B2 * | 8/2017 | Field, Jr. | B60R 9/065 |
| D800,396 S | 10/2017 | Coviello | |
| D801,256 S | 10/2017 | Kasparian | |
| 9,783,016 B2 | 10/2017 | Forhan | |
| D805,973 S | 12/2017 | Mullaney | |
| D809,083 S | 1/2018 | Fritschy | |
| 9,862,430 B1 | 1/2018 | Stojkovic | |
| D809,435 S | 2/2018 | Gertner | |
| D810,699 S | 2/2018 | Velez | |
| 9,884,593 B2 | 2/2018 | Hull | |
| D811,853 S | 3/2018 | Foley | |
| D813,142 S | 3/2018 | Curts | |
| 9,932,143 B2 | 4/2018 | Henderson | |
| D819,540 S | 6/2018 | Wilson | |
| 10,005,382 B1 * | 6/2018 | Rossi | G09F 21/04 |
| 10,059,407 B1 * | 8/2018 | Ingalls | B63B 29/06 |
| D846,481 S * | 4/2019 | Turner | D12/400 |
| 2005/0092213 A1 * | 5/2005 | Wilson | B60N 3/001 |
| | | | 108/44 |
| 2006/0214449 A1 | 9/2006 | Klusmeier | |
| 2007/0204896 A1 * | 9/2007 | Gereke-King | A45B 23/00 |
| | | | 135/88.08 |
| 2007/0210599 A1 | 9/2007 | Arnold | |
| 2008/0231067 A1 | 9/2008 | Nagle | |
| 2009/0140024 A1 | 6/2009 | McLemore | |
| 2010/0059093 A1 * | 3/2010 | Clark | B60R 9/00 |
| | | | 135/16 |
| 2010/0176170 A1 | 7/2010 | O'Hare | |
| 2010/0224663 A1 | 9/2010 | Butler, III | |
| 2012/0090513 A1 * | 4/2012 | Mesker | G09F 17/00 |
| | | | 108/44 |
| 2012/0261938 A1 | 10/2012 | Roach | |
| 2014/0053389 A1 | 2/2014 | Galindo | |
| 2014/0054299 A1 * | 2/2014 | Karnin | A45C 15/06 |
| | | | 220/592.2 |
| 2014/0110555 A1 | 4/2014 | Maddux | |
| 2014/0205367 A1 | 7/2014 | Sung | |
| 2015/0175085 A1 | 6/2015 | Raley | |

OTHER PUBLICATIONS

The Tail Gate Table, image post date Nov. 11, 2012, site visited Jul. 11, 2018, (online), <https://www.aughog.com/ the-tail-gate-table!>.
Patio-Beach Umbrella Bracket, image post date Jan. 8, 2010, site visited Jul. 11, 2018, (online), <https://web.archive.org/ web/ 20100108045718/http://hitchet.com/Products.htm>.

* cited by examiner

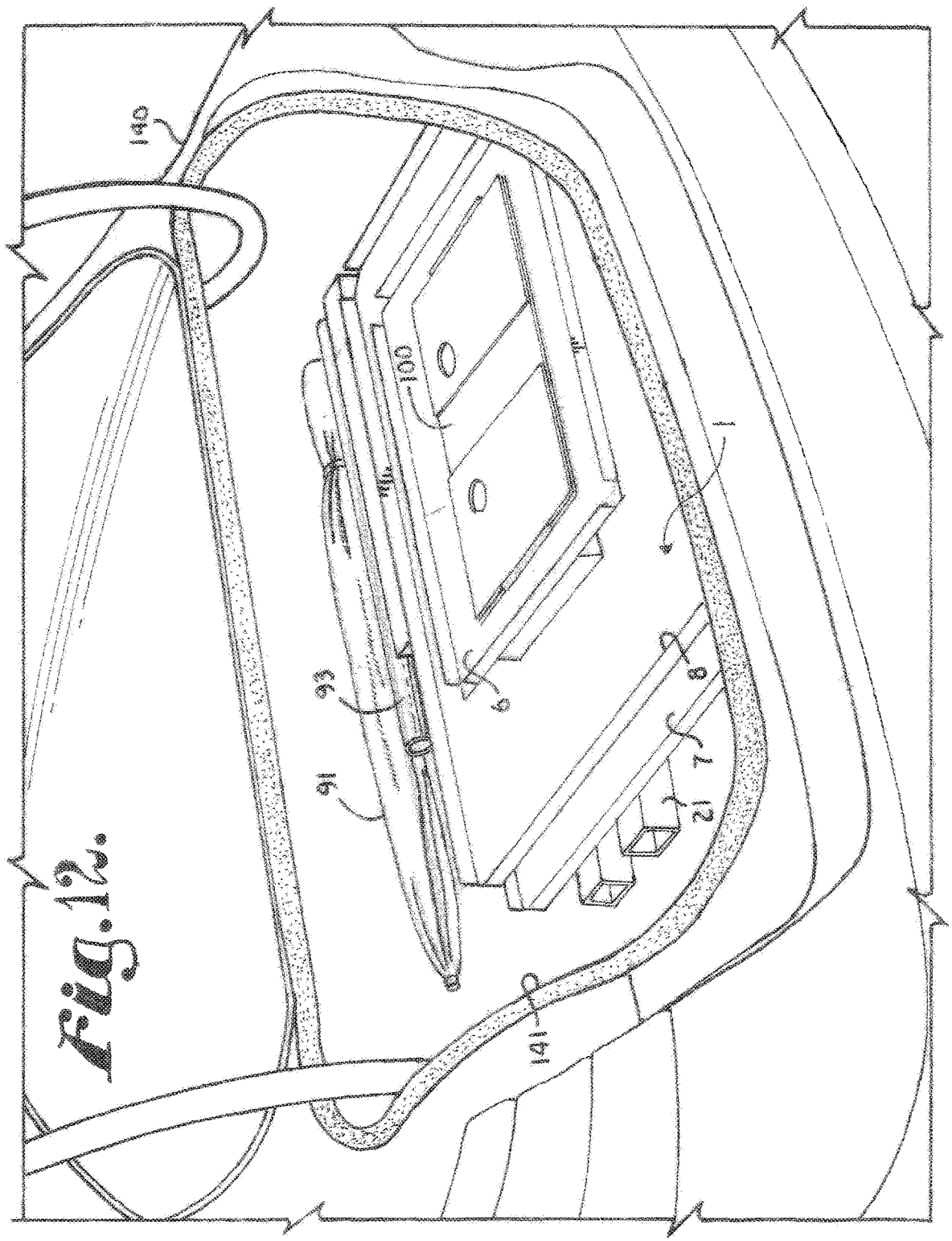

EASILY DISASSEMBLE TAIL GATE APPARATUS

CROSS REFERENCE TO RELATED APPLICATIONS

This application is a continuation-in-part of Design application Ser. No. 29/612,743 filed Aug. 3, 2017, the contents of which are incorporated herein by reference.

BACKGROUND OF THE INVENTION

Field of the Invention

It has become very popular at various sporting events, especially American football games, to have get-togethers with others before the games in parking lots, or the like, which is generally referred to as "tail gating". At such events, the participants often eat and mingle with others. A common form of eating is to have grills where hamburgers, hot dogs, steaks and other meat based foods are cooked and participants sit and eat food and talk with each other. The term tail gating comes from those who originally arrived at the venue in a truck and lowered the tailgate on the truck to set out food and other items to share with each other or with persons from other vehicles who mingled with the crowd.

Description of the Related Art

Various types of tables, such as card tables and the like, have been used for tail gating, along with the original truck tail gate.

SUMMARY OF THE INVENTION

The present invention is directed to an assembly that allows a user to quickly and easily remove various elements of the assembly from a vehicle transporting the assembly to a place of use, such as a car or truck, and then without the need for tools to easily an d q2uickly assemble the assembly by simply sliding various elements together, so as to be mostly held in place by gravity. When use is ended, the assembly is taken apart, principally by simple lifting of the elements which are then returned to the vehicle.

In one embodiment, the assembly is a tail gate apparatus comprising an elongate low profile support frame; the frame when in use extending generally horizontally; a first support that is rigidly joined to the frame and extends vertically in use; the first support having a first bore extending into the first support and opening upwardly in use; a first table including a planar upper surface and having a lower spindle fixedly attached to a bottom of the first table and being snugly and rotatably received in the bore of the first support; the first table being rotatable to a user selected position on the first table lower spindle and the first table being easily removable from the frame by being raised by a user; the frame having first and second arms that extend laterally and horizontally from and are fixedly attached to the frame; each of the arms including second and third supports respectively; the second and third supports each including a cylindrical bore that extends vertically and opens upwardly in use; second and third tables that each have a lower cylindrical spindle rigidly attached to an underside thereof; the second and third table spindles are received in the second and third supports respectively and allow the second and third tables to rotate in a horizontal plane under control of the user and allow the user to selectively remove the second and third tables from the frame by lifting the second and third tables; a fourth table having a lower cylindrical shaped spindle rigidly attached to an underside of the fourth table; a fourth support being fixedly mounted on the frame and extending upwardly therefrom; the fourth support having a cylindrical shaped bore that opens upwardly; the fourth table spindle being snugly and rotatably received in the fourth support bore and the fourth table being readily removable from the fourth support by raising the fourth table; the fourth support and the fourth table cooperating to position the fourth table above the second and third tables; the fourth table including a planar upper surface and a lower eating ware container attached to an underside of the third table; the container including a slidable tray adapted to receive table ware; fifth and sixth supports rigidly secured to the frame and extending upwardly therefrom; first and second umbrellas each having an upright shaft respectively; the upright shafts of the first and second umbrellas being removably received in the fifth and second supports and the first and second umbrellas being at least partially horizontally spaced from each other; a hitch like device at a rear end of the frame for securing the frame to a vehicle to provide stability to the frame; a pair of outrider stabilizing shafts, each of the shafts being removably attachable to the second and third tables respectively and to extend between the second and third tables respectively and a ground area over which the apparatus is located; the shafts providing additional stability to the apparatus so that the apparatus is not rotated when someone or something engages the first, second, third, and fourth tables; and the first and second umbrellas and the first, second, third, and fourth tables all being mounted upon and removeable from the frame without the use of tools so that the apparatus can be easily disassembled in an unassembled configuration for transport and storage.

In a further embodiment, the assembly is a tail gating apparatus comprising an elongate shaft with a plurality of upwardly opening receivers; each of the receivers receiving respectively a plurality of tables and umbrellas such that the tables and umbrellas are placed into and removable from the receivers without the use of tools and held therein by gravity such that the tables are easily horizontally rotatable by a user and that the tables and umbrellas are easily moveable between a use configuration on the shaft and a storage configuration wherein the apparatus is disassembled.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

BRIEF DESCRIPTION OF THE DRAWINGS

FIG. 12 is a fifth perspective view of the assembly shown in a disassembled configuration in the trunk of a car.

DETAILED DESCRIPTION OF THE PREFERRED EMBODIMENTS

Figure 1:
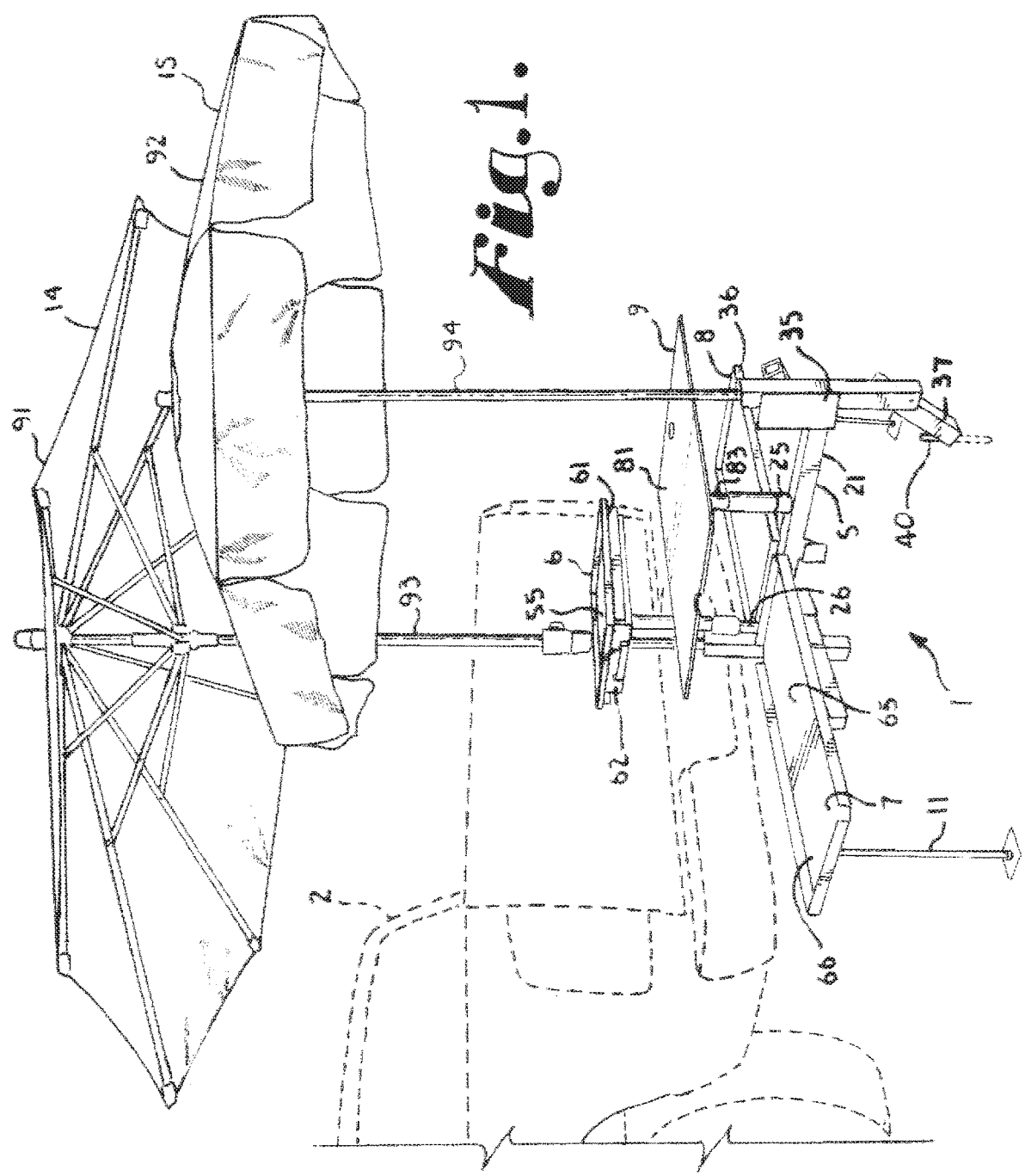
FIG. 1 is a perspective view of a tail gate assembly in accordance with the invention, shown in association with a partial truck illustrated in phantom lines.
Figure 2:
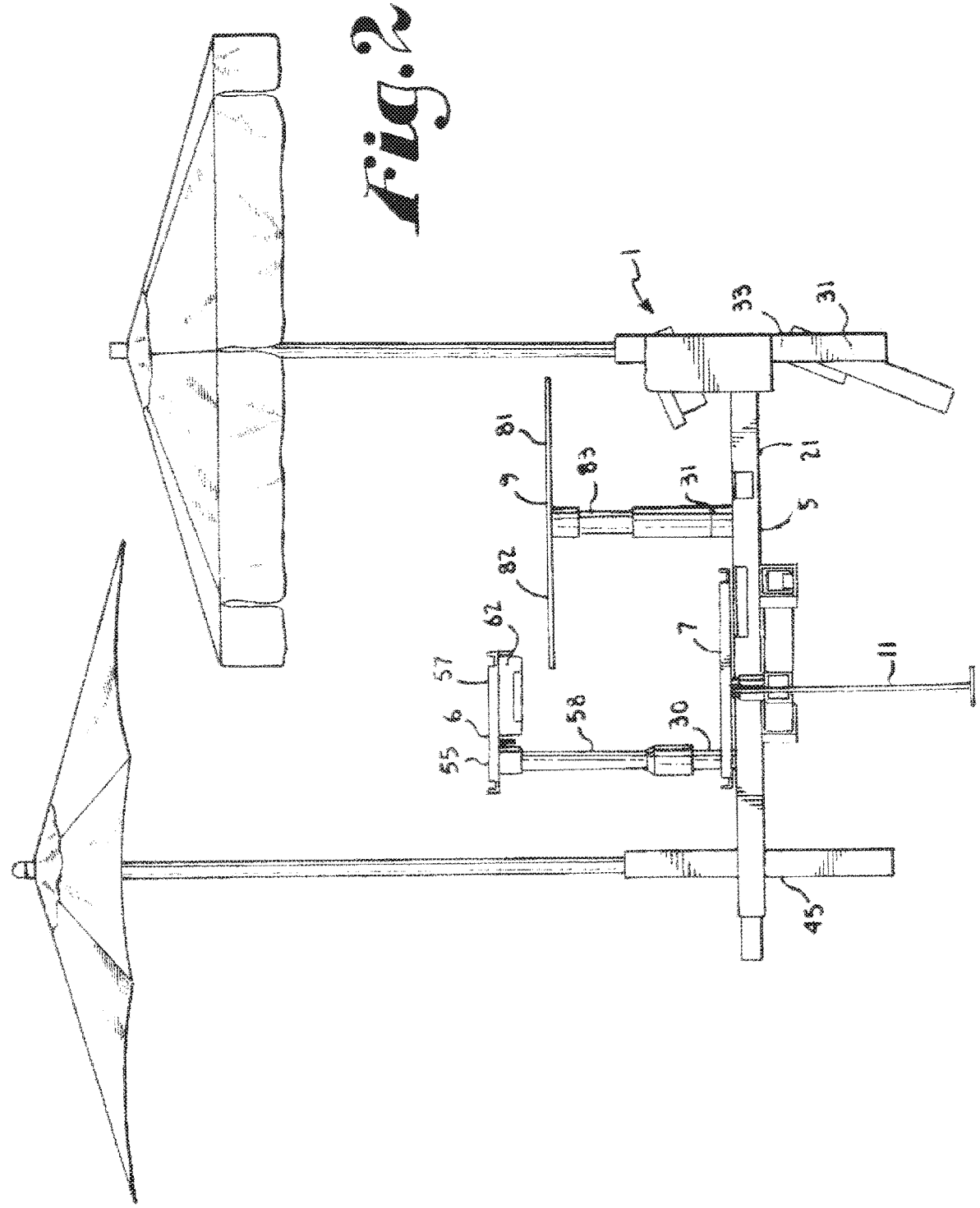
FIG. 2 is a side elevational view of the assembly.
Figure 3:
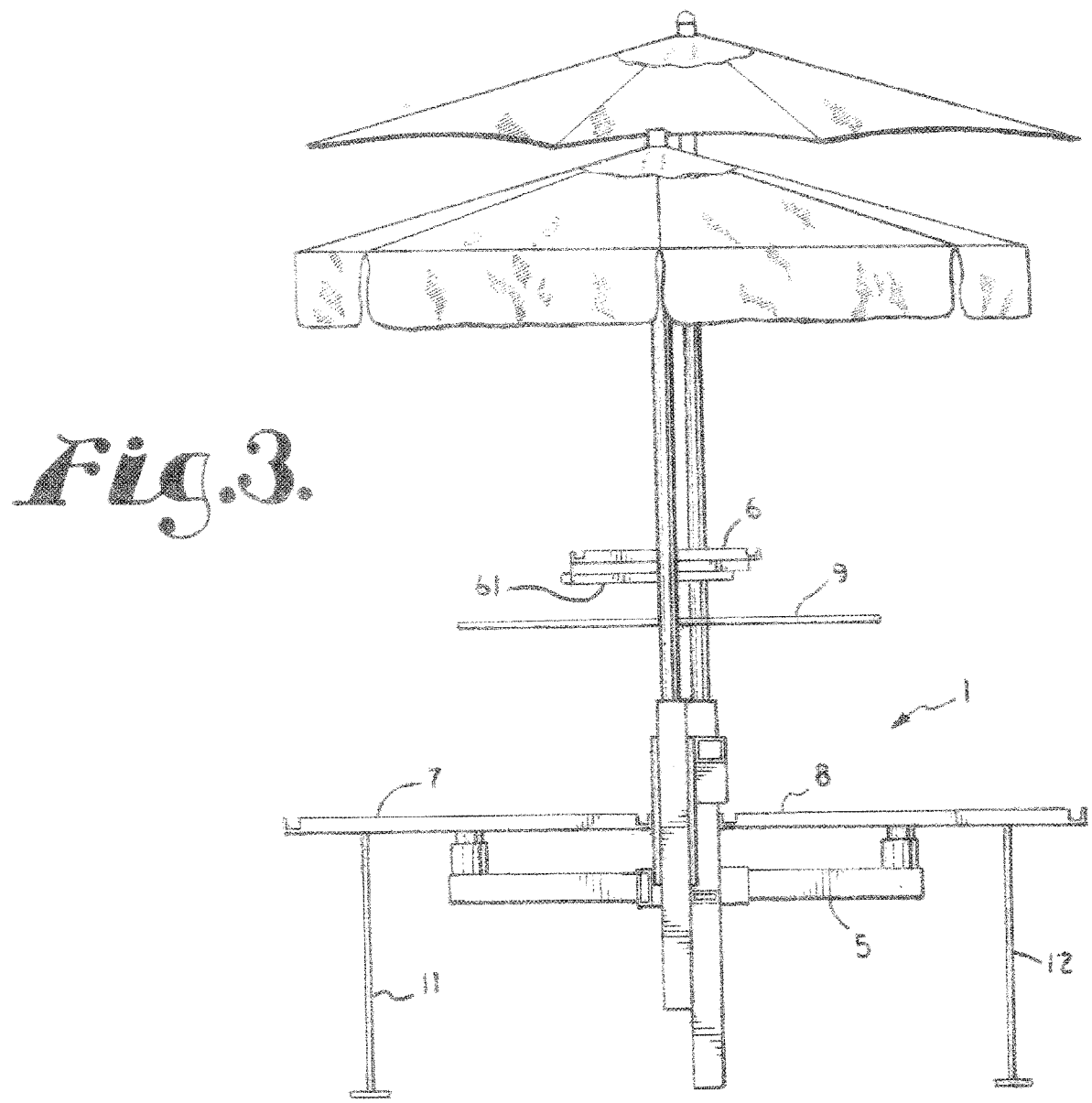
FIG. 3 is a rear elevational view of the assembly.
Figure 4:
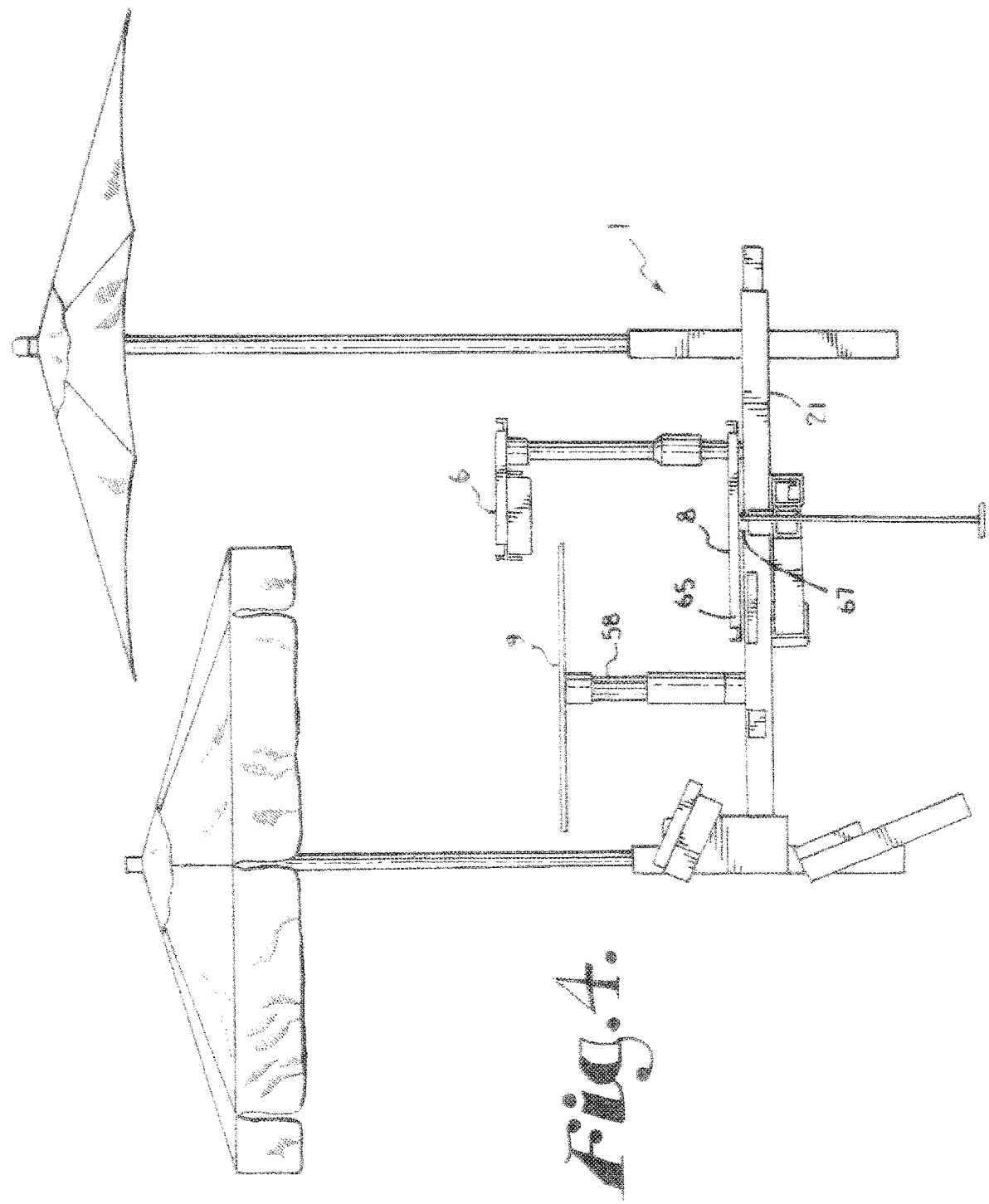
FIG. 4 is a second side elevational view of the assembly.
Figure 5:
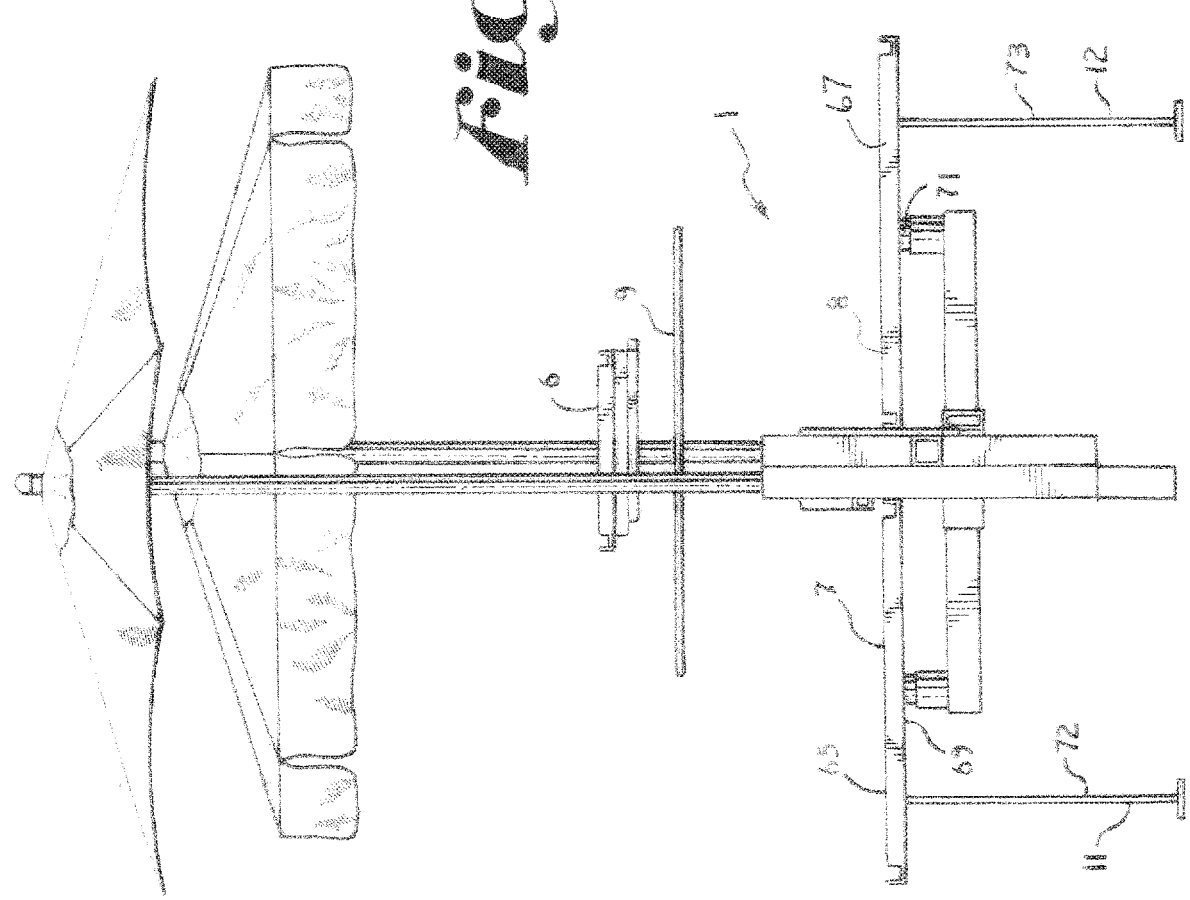
FIG. 5 is a front elevational view of the assembly.
Figure 6:
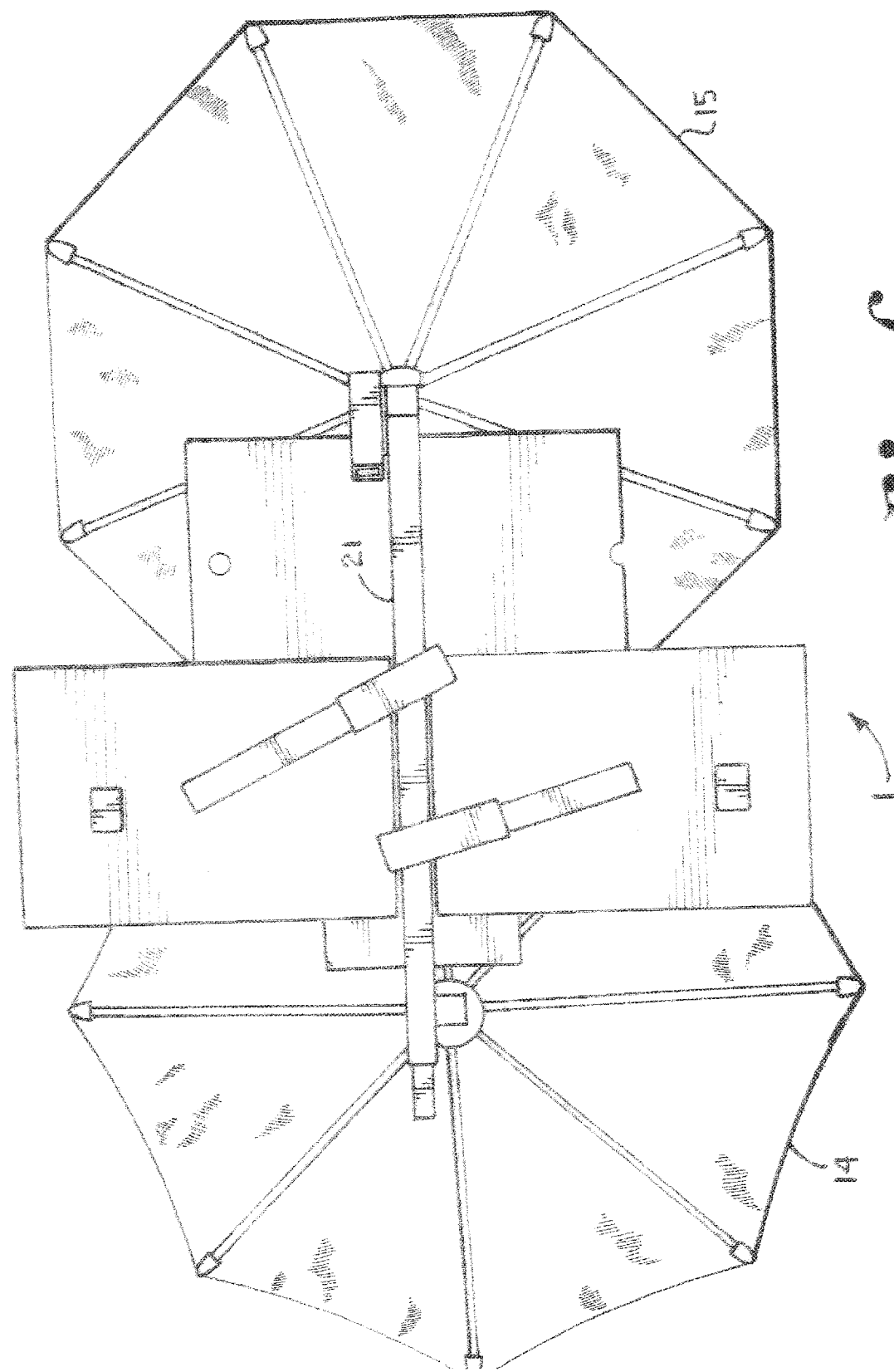
FIG. 6 is a bottom plan view of the assembly.
Figure 7:
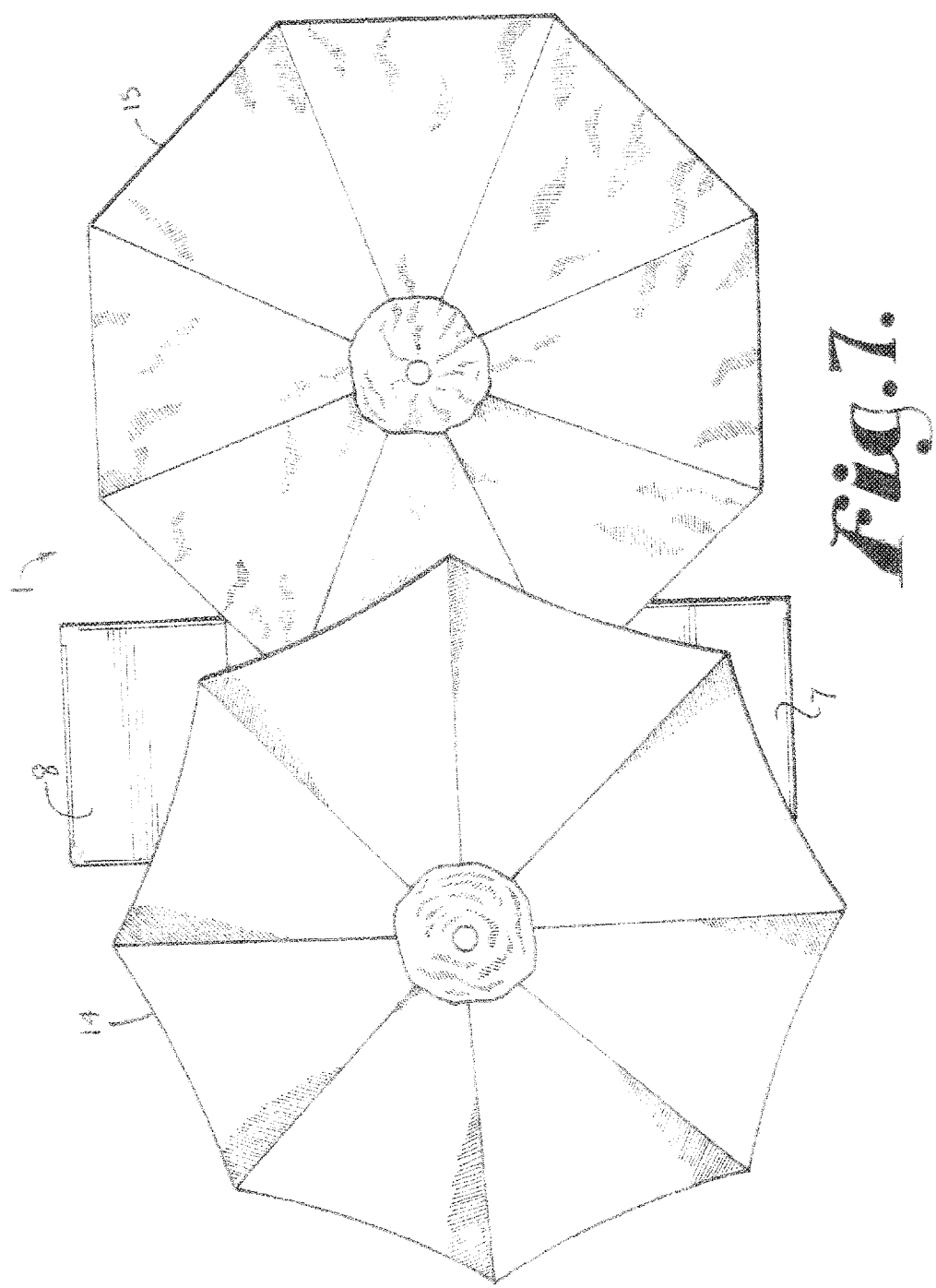
FIG. 7 is a top plan view of the assembly

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

The reference numeral 1 generally identifies an embodiment of a tailgate assembly or apparatus according to the present application. The apparatus 1 is able to stand alone and be self-supporting (such as in FIG. 9) or utilized in conjunction with a vehicle, such as the illustrated truck 2 in FIG. 1.

The apparatus 1 includes a low profile frame 5, a first table 6, a second table 7, a third table 8, a fourth table 9, a first stabilizing shaft 11, a second stabilizing shaft 12, a first umbrella 14 and a second umbrella 15.

Figure 9:
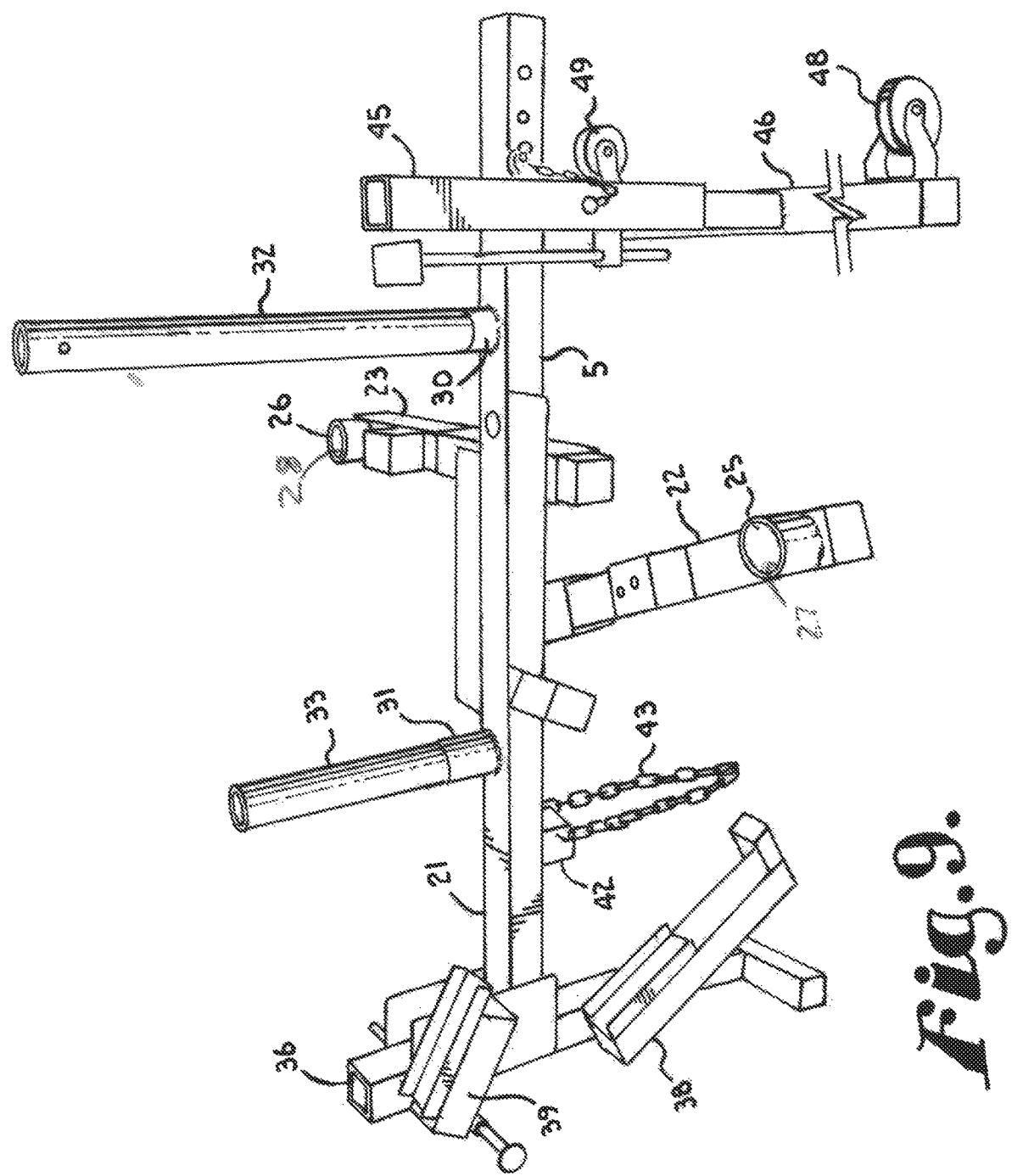
FIG. 9 is a second perspective view of the assembly with elements thereof removed to illustrate principally a support frame thereof and with certain elective elements added.

The frame 1 is best illustrated in FIG. 9 and is configured to have a relatively low profile and generally elongated with a front being to the left in FIG. 9. The frame 1 has a central front to rear shaft 21 with a pair of laterally extending arms 22 and 23 that protrude horizontally and almost perpendicularly, but at a slight angle, from the shaft 21. Each arm 22 and 23 has a cylindrical shaped upwardly extending support 25 and 26 respectively that are rigidly joined with each respective arm 22 and 23 near a distal end of the arm. Each support (receiver) 25 and 26 has a bore 27 and 28 respectively that extends downwardly from the top of the respective supports 25 and 26.

Along the shaft 21 and located in spaced relationship to the arms 22 and 23 and the front and rear of the shaft 21 are two rigid and upwardly extending cylindrical supports 30 and 31. The illustrated supports 30 and 31 each have an extension tube 32 and 33 removably sleeved thereon. Mounted on the shaft front end is a vertically extending leg 35. The leg 35 is an upright boxed tube that is open at the top 36 thereof. The leg 35, as illustrated in FIG. 1, also has a removable foot or stand 37 attached near a lower end thereof. Associated with the front leg 35 is a rifle mount 38 and a fishing pole mount 39 that are movable receptacles for supporting a rifle and fishing pole (not shown) when not in use. Depending from the shaft 21 is a rigidly attached square tube 42 for holding a chain 43, or the like to secure the apparatus 1 to a fixed structure.

Located near the rear of the shaft 21 is a rigidly attached tube 45 that extends vertically and has an open top.

Figure 10:
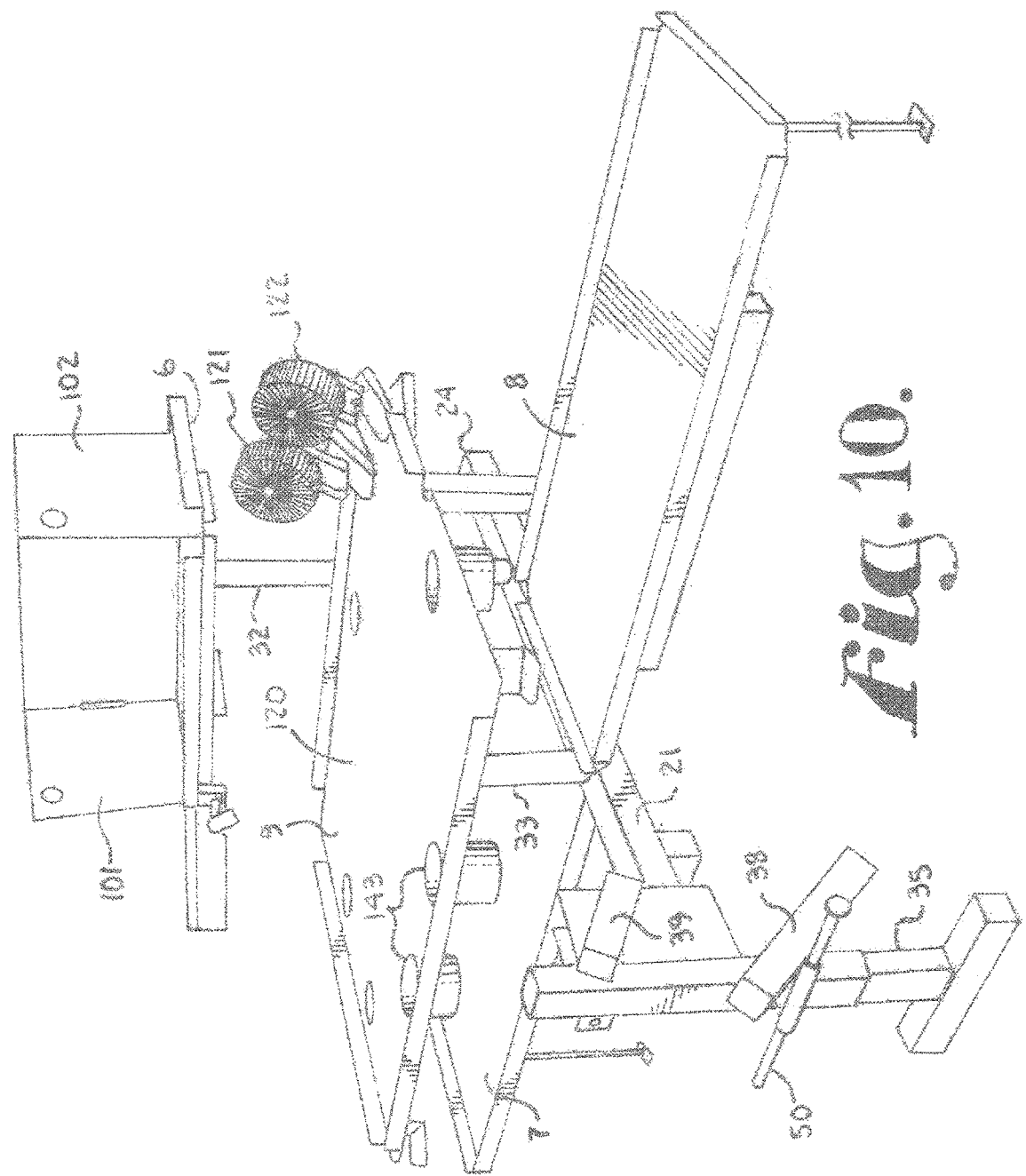
FIG. 10 is a third perspective view of the assembly with certain elective elements added.

A lower end of the tube 45 is also open and has an interior that removably receives a T-shaped element 46 that is removed in the non-moving position or configuration shown in FIG. 1, but which is shown in FIGS. 9 and 10. The T-shaped element 46 includes rearward facing wheels 48 and 49 on the front of opposite lateral sides thereof. If it is decided to move the position of the shaft 21 or apparatus 1, the front end of the shaft 21 is raised and pivoted on the T-shaped element 46 until the wheels 48 and 49 engage the ground and then the shaft is rolled on the wheels 48 and 49 to a new location. The T-shaped element 46 is made sufficiently narrow to pass through doorways while being broad enough to provide stability while moving. The T-shaped element 46 is easily removed when the shaft 21 or overall apparatus 1 is at a final location. An elongate bar 50 which extends laterally on the leg 35 and is held by a tube may be used to grip when moving the assembly 1.

The first table 6 is a structure 55 with a generally planar surface 56 and side walls 57. The structure 55 has a lower vertically extending and rigidly attached spindle 58 extending from near a middle thereof. The spindle 58 slidably and removably mounts in the support 30 so that the table 6 is rotatable thereabout. Also, attached to a lower side of the table structure 55 is a tray 61 with a drawer 62 that is adapted to receive eating utensils (not shown) and the like.

Figure 8:
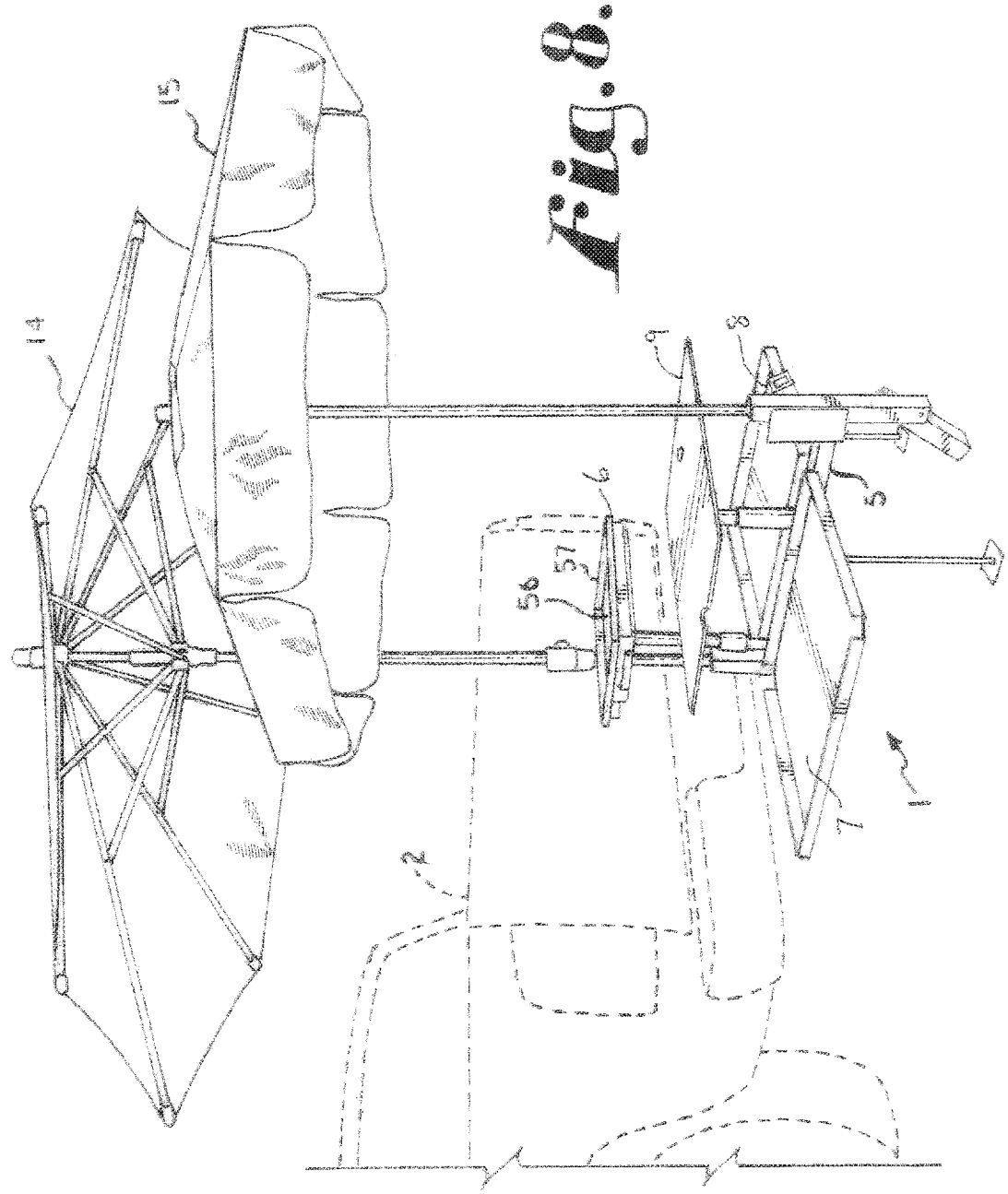
FIG. 8 is a second perspective view of the assembly with rotated tables.

The second table 7 has a horizontally extending structure 65 with a planar upper surface 66 and a second spindle 67 that is cylindrical in shape and vertically extending downwardly from a middle thereof. The spindle 67 is slidably and removably received in the support 25 of the first arm 22. Likewise, the table 8 has a horizontally extending structure with a planar upper surface 70 and a perpendicular spindle 71 that is rigidly joined to the structure 69 and is received in the support 26 of the second arm 23. The table 8 is free to rotate fully in a horizontal plane relative to the shaft 21 and is easily removed by simply raising the table 8 relative to the shaft 21. The tables 7 and 8 can be rotated such as shown in FIG. 10 to form an almost continuous top or ninety degrees to that configuration, as shown in FIG. 8, to provide a different configuration depending on the needs of the user. Each of the tables 7 and 8 and have an outlying support rod 72 and 73 respectively attached thereto to a bottom socket 74 to alternatively provide additional lateral support to the tables 7 and 8, if heavy items are placed on them.

A fourth table 9 likewise has a structure 81 that extends horizontally to provide an upper planar surface 82. The structure 81 also has a spindle 83 rigidly and securely mounted to the bottom thereof about in the horizontal center of the structure 81. The spindle 83 is cylindrically shaped and smooth and is received in the support 30 and held in place by gravity, so as to be both rotatable therein and easily removed by lifting upward. The structure 81 of table 9, or any of the tables 6 to 9 may include pass through bores 90 for holding cups, or the like. An alternative table top for table 9 is shown in FIG. 10 with multiple cup receivers, such as receivers 143.

The umbrellas 14 and 15 each have a respective canopy 90 and 91 and a support pole 93 and 94 that mate with lower sections 95 and 96. The sections 95 and 96 are respectively slidably receivable in the front tube support 31 and rear tube support 32 and are easily removed by lifting upward.

Consequently, all necessary elements of the apparatus 1 are assembled without the use of tools or toollessly by simple sliding of the parts together vertically and easily disassembled by raising or lifting the various elements from the shaft 21, again without the use of tools. In this manner, the elements are held together by gravity when in use.

When not in use, the elements are disassembled and can be placed in a relatively small and low profile pile, assemblage or stack that is low in profile that can fit into small spaces, such as the trunk of a car 141 (as seen in FIG. 12) or a truck bed for transport and likewise in a relatively small storage configuration for storage.

FIG. 9 illustrates the rod or pin 50 that is positioned to grab and lift when it is desired to move the apparatus 1 and the T-shaped element 46 with wheels 48 and 49 are joined to the shaft 21, as seen in FIG. 9. The shaft 21 is shown without the other elements in FIG. 9, such as removed tables 6, 7, 8, and 9.

In FIG. 10, a shield 98 has been added to and extends upward form the table 6. The shield 98 has a rear panel 100 hingedly joined with two side panels 101 and 102. The shield 98 can be used with light items (not shown) located on the table 6 to prevent wind from blowing the items off. The table 6, as illustrated in FIG. 10 also has several bores 105 and 106 with cylindrical extensions 107 and 108 that function as cup or bottle holders.

Figure 11:
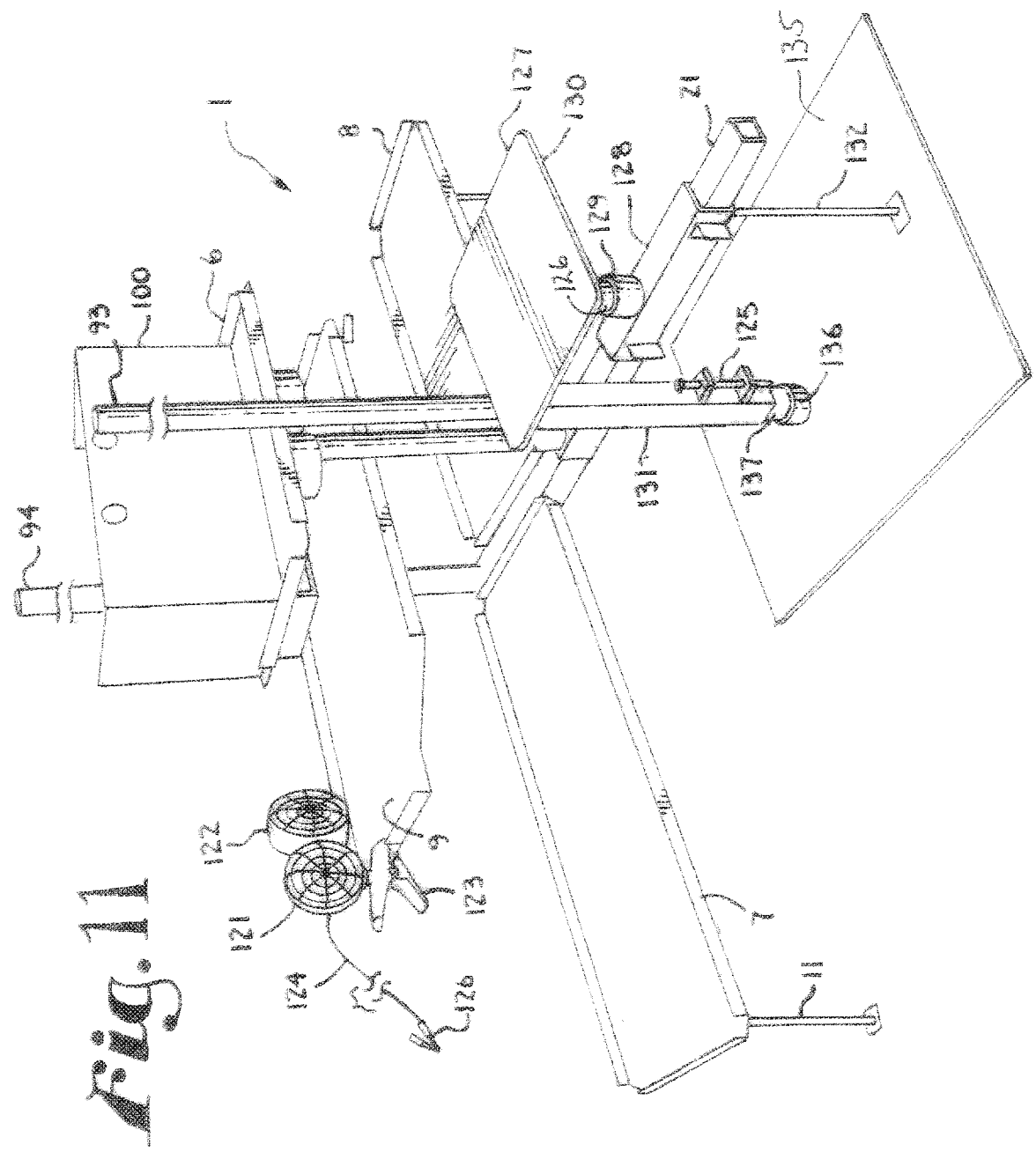
FIG. 11 is a fourth perspective view of the assembly in a disassembled configuration in a vehicle for transport.

Shown in FIG. 11 is the assembly 1 with certain alternative elements added and removed to suit a user. In particular, FIG. 11 shows a pair of fans 121 and 122 attached by clamps 123 to a selected table, such as table 9. The fans 121 and 122 are powered preferably by a power cord 124 that joins with the battery of a vehicle, such as truck 2 or they may be operated by a self-contained battery.

A spike 125 is shown in FIG. 11 and can be used to push into the ground for stability when needed but is shown in a stored configuration.

An alternative seat apparatus 127 is also shown in FIG. 11. The apparatus 127 includes a slidable sleeve 128 that mounts on shaft 21. The sleeve 128 has an upper rigid cylindrical support 129 that receives a spindle 126 attached to the bottom of a planar seat 130. A secured leg 131 with an attached sleeve 132 that slidably mounts on the shaft 21 is located beside and supports the seat apparatus 127. In order to place the seat apparatus 127 on the shaft 21, the front leg 35 is first removed.

In FIG. 1 the rear of the apparatus 1 is secured to the truck 2 by a hitch on the like for stability. A foot or stabilizer plate 135 is utilized when the apparatus 1 is not attached to a vehicle, such as truck 2, for support. The plate 135 has an upwardly projecting rigid receiver 126 in the center thereof. The rear leg 131 or, alternatively, the tube 45 has a mating rod 138 placed therein that is then received in the receiver 136. The plate 135 is about one half the horizontal length and width of the apparatus 1 in size and provides stabilizing to prevent the apparatus 1 from tilting over in wind or the like.

As seen in FIG. 12, the apparatus 1 is in a disassembled configuration and is seen placed in a trunk 141 of a car 140.

It is to be understood that while certain forms of the present invention have been illustrated and described herein, it is not to be limited to the specific forms or arrangement of parts described and shown.

What is claimed and desired to be secured by Letters Patent is as follows:

1. A tail gate apparatus comprising
a) an elongate low profile support frame; the frame when in use extending generally horizontally;
b) a first support that is rigidly joined to the frame and extends vertically in use;
the first support having a first bore extending into the first support and opening upwardly in use;
c) a first table including a planar upper surface and having a lower spindle fixedly attached to a bottom of the first table and being snugly and rotatably received in the bore of the first support; the first table being rotatable to a user selected position on the first table lower spindle and the first table being easily removable from the frame by being raised by a user;
d) the frame having first and second arms that extend laterally and horizontally from and are fixedly attached to the frame; each of the arms including second and third supports respectively; the second and third supports each including a cylindrical bore that extends vertically and opens upwardly in use;
e) second and third tables that each have a lower cylindrical spindle rigidly attached to an underside thereof; the second and third table spindles are received in the second and third supports respectively and allow the second and third tables to rotate in a horizontal plane under control of the user and allow the user to selectively remove the second and third tables from the frame by lifting the second and third tables;
f) a fourth table having a lower cylindrical shaped spindle rigidly attached to an underside of the fourth table;
g) a fourth support being fixedly mounted on the frame and extending upwardly therefrom; the fourth support having a cylindrical shaped bore that opens upwardly; the fourth table spindle being snugly and rotatably received in the fourth support bore and the fourth table being readily removable from the fourth support by raising the fourth table; the fourth support and the fourth table cooperating to position the fourth table above the second and third tables; the fourth table including a planar upper surface and a lower eating ware container attached to an underside of the fourth table; the container including a slidable tray adapted to receive table ware;
h) fifth and sixth supports rigidly secured to the frame and extending upwardly therefrom;
i) first and second umbrellas each having an upright shaft respectively; the upright shafts of the first and second umbrellas being removably received in the fifth and second supports and the first and second umbrellas being at least partially horizontally spaced from each other;
j) a hitch like device at a rear end of the frame for securing the frame to a vehicle to provide stability to the frame;
k) a pair of outrider stabilizing shafts, each of the shafts being removably attachable to the second and third tables respectively and to extend between the second and third tables respectively and a ground area over which the apparatus is located; the shafts providing additional stability to the apparatus so that the apparatus is not rotated when someone or something engages the first, second, third, and fourth tables; and
l) the first and second umbrellas and the first, second, third, and fourth tables all being mounted upon and removeable from the frame without the use of tools so that the apparatus can be easily disassembled in an unassembled configuration for transport and storage.

2. The apparatus according to claim 1 including:
a) first and second receivers secured to the frame at a frontward end thereof; the first receiver being sized and shaped to receive and support a rifle when the rifle is not in use; the second receiver being sized and shaped to receive a fishing pole when the fishing pole is not in use.

3. The apparatus according to claim 1 including:
a) a seat apparatus having a sleeve that is slidably received on the shaft with a seat receiver secured to the top of the sleeve and a planar seat with a seat spindle extending downwardly from the seat and mounted in the seat receiver.

4. The apparatus according to claim 1 including a ground engaging stabilizing plate; the plate having a width and length approximately at least one half that of the apparatus when assembled; the apparatus including a leg with a lower end that is received in a plate receiver fixedly mounted on the top of the plate for stability.

5. The apparatus according to claim 1 including a shield that is positioned on the first table and extends vertically; the shield including a rear with two opposite and hingedly attached side panels; the shield adapted to be positioned to block wind from blowing objects off of the first table.

6. The apparatus according to claim 1 including a transport mechanism comprising a Tshaped structure with a pair of wheels on a front side of a top of the T-shaped structure; the bottom of the T-shaped structure being received in the lower end of a rear leg of the shaft; upon lifting a front end of the shaft, the wheels rotating into a ground engaging configuration such that the apparatus can be manually moved on the wheels by a user.

* * * * *